(12) United States Patent
Hurst

(10) Patent No.: US 7,438,802 B2
(45) Date of Patent: Oct. 21, 2008

(54) RUN-OFF WATER FILTER FOR STORM DRAINS

(76) Inventor: John G. Hurst, 1822 Orchard Wood Rd., Encinitas, CA (US) 92024

( * ) Notice: Subject to any disclaimer, the term of this patent is extended or adjusted under 35 U.S.C. 154(b) by 0 days.

(21) Appl. No.: 11/343,150

(22) Filed: Jan. 30, 2006

(65) Prior Publication Data

US 2006/0124520 A1    Jun. 15, 2006

Related U.S. Application Data

(63) Continuation-in-part of application No. 10/980,941, filed on Nov. 3, 2004, now Pat. No. 7,208,082.

(51) Int. Cl.
E03F 5/14    (2006.01)

(52) U.S. Cl. .................. 210/163; 210/164; 210/348; 210/359; 404/4

(58) Field of Classification Search .............. None
See application file for complete search history.

(56) References Cited

U.S. PATENT DOCUMENTS

| 459,259 | A | | 9/1891 | Shunk et al. |
|---|---|---|---|---|
| 1,861,031 | A | | 5/1932 | Schmitt |
| 1,999,637 | A | | 4/1935 | Pettepher |
| 2,555,826 | A | * | 6/1951 | Tallman ..................... 239/104 |
| 3,917,150 | A | * | 11/1975 | Ferguson et al. ............ 228/159 |
| 3,979,920 | A | * | 9/1976 | Burgess et al. .............. 405/147 |
| 4,418,432 | A | | 12/1983 | Vidal |
| 4,457,515 | A | * | 7/1984 | Eidschun .................... 277/301 |
| 4,594,157 | A | | 6/1986 | McGowan |
| 4,671,976 | A | | 6/1987 | Vidal |
| 5,003,642 | A | | 4/1991 | Robb et al. |
| 5,007,766 | A | | 4/1991 | Freed et al. |
| 5,034,122 | A | | 7/1991 | Wiesemann |
| 5,223,154 | A | | 6/1993 | MacPherson et al. |
| D341,413 | S | | 11/1993 | Nichols |
| 5,264,134 | A | | 11/1993 | McCamy |
| 5,304,311 | A | | 4/1994 | Codiglia |
| 5,345,741 | A | | 9/1994 | Slater et al. |
| 5,403,474 | A | | 4/1995 | Emery |
| 5,447,637 | A | | 9/1995 | Barber |

(Continued)

OTHER PUBLICATIONS

Filtr-Fence, Product Information, ACF Environmental website, www.acfenvironmental.com, May 2004, (1 page).

(Continued)

*Primary Examiner*—Robert James Popovics
(74) *Attorney, Agent, or Firm*—Donald L. Wenskay

(57) ABSTRACT

A storm drain filter assembly that filters incoming drainage water and can prevent sediment, debris, and other undesirable materials (such as oil) from entering a storm drain's inlet. The frame can be rotated upwardly away from the road for street sweeping, and can also be detached from the curb and removed to a remote location for cleaning. The filter assembly comprises a filter panel including a bristle filter and a frame that holds the bristle filter, the bristle filter including a plurality of bristles. At least one seal is positioned between the filter panel and the surface to prevent leakage around the edges of the panel. A pivotable mount is provided for holding the filter panel in an operational position in the path of the flowing drainage water. In one embodiment the bristles are made of polypropylene.

16 Claims, 9 Drawing Sheets

U.S. PATENT DOCUMENTS

| | | | |
|---|---|---|---|
| 5,534,140 | A | 7/1996 | Brummond et al. |
| 5,702,595 | A | 12/1997 | Mossburg, Jr. et al. |
| 5,720,890 | A | 2/1998 | Caliva |
| 5,788,849 | A | 8/1998 | Hutter, Jr. et al. |
| 5,819,357 | A | 10/1998 | Gould |
| 5,843,306 | A | 12/1998 | Singleton |
| 5,851,087 | A | 12/1998 | Berry, III |
| 5,855,774 | A | 1/1999 | Boelter |
| 5,989,417 | A | 11/1999 | Fleischhacker |
| 6,004,457 | A | 12/1999 | Singleton |
| 6,015,489 | A | 1/2000 | Allen et al. |
| 6,017,166 | A | 1/2000 | Mossburg, Jr. et al. |
| 6,053,665 | A | 4/2000 | Richardson |
| 6,250,476 | B1 | 6/2001 | Kroon et al. |
| 6,402,942 | B2 | 6/2002 | Cardwell et al. |
| 6,422,787 | B1 | 7/2002 | Mikell |
| 6,572,040 | B1 | 6/2003 | Brown, Jr. |
| 6,679,994 | B1 | 1/2004 | Turco et al. |
| 6,733,663 | B1 | 5/2004 | Simon et al. |
| 6,749,745 | B2 | 6/2004 | Jowett |
| 6,802,964 | B2 | 10/2004 | Preisser et al. |
| 6,811,692 | B2 * | 11/2004 | Koteskey ............... 210/238 |
| 6,922,953 | B1 | 8/2005 | Lewis |
| 6,953,524 | B2 | 10/2005 | Woodbridge et al. |
| 7,001,527 | B2 | 2/2006 | Stever et al. |
| 7,182,856 | B2 | 2/2007 | Pank |
| 7,208,082 | B2 * | 4/2007 | Hurst et al. ............ 210/164 |
| 7,232,525 | B2 | 6/2007 | Eriksen |
| 7,285,216 | B2 | 10/2007 | Rose et al. |
| 7,309,443 | B2 | 12/2007 | Kelty |
| 7,314,571 | B2 | 1/2008 | Lovestead et al. |
| 7,341,670 | B2 | 3/2008 | Ghalib |
| 2003/0173277 | A1 | 9/2003 | Shaw et al. |
| 2004/0065612 | A1 | 4/2004 | Wilkinson |
| 2004/0069697 | A1 | 4/2004 | Martinez |
| 2004/0134843 | A1 | 7/2004 | Kolb |
| 2004/0195160 | A1 | 10/2004 | Max et al. |
| 2005/0051467 | A1 | 3/2005 | Yehuda |
| 2005/0061750 | A1 | 3/2005 | Fabri et al. |
| 2005/0161372 | A1 | 7/2005 | Colic |
| 2006/0091049 | A1 * | 5/2006 | Hurst et al. ............ 210/163 |
| 2006/0124520 | A1 * | 6/2006 | Hurst ................... 210/163 |
| 2006/0207933 | A1 | 9/2006 | Wang |
| 2007/0045162 | A1 * | 3/2007 | Hurst et al. ............ 210/163 |
| 2007/0102359 | A1 | 5/2007 | Lombardi |
| 2008/0036268 | A1 | 2/2008 | Glista |
| 2008/0105603 | A1 * | 5/2008 | Hurst ................... 210/163 |

OTHER PUBLICATIONS

Trash Racks Water Screening Devices Product Information, ACF Environmental website, www.acfenvironmental.com, May 2004, (1 page).

Gutterbuddy Curb Gutter Storm Drains Product Information, ACF Environmental website, www.acfenvironmental.com, May 2004, 2 pages.

Hydro-Kleen Storm Water Filtration System, Product Information, ACF Environmental website, www.acfenvironmental.com, May 2004, 2 pages.

Kristar Product Information including Work-Gard, Flo-Gard, Flo-Gard+plus, Kristar website, www.kristar. May 3, 2004, 9 pages.

Dandy Products Information: Beaver Dam (2 pgs), Dandy Bag (2 pgs), TrueDam (2 pgs), www.dandyproducts.com, circa 2004.

Advertisements: North American Green (1 pgs), The BMP Store (1 pgs), Dandy Products (1 pgs), *Erosion Control*, vol. 11, No. 3, May/Jun. 2004, pp. 2, 4, 5.

SeaSafe Strut Systems Product Information, 1 page, circa Sep. 2004.

Revel Environmental Manufacturing Website printout of Products, "Trench Drain and Trench Dam Filters" http://www.remfilters.com/products/trench_filters.rem, printed Aug. 29, 2006.

Revel Environmental Manufacturing, Inc. website printout "About REM" (2 pages).

Revel Environmental Manufacturing, Inc., brochure, "Curb Protector ™" (2 pages).

Revel Environmental Manufacturing, Inc., brochure, "Triton Filter ™ Curb Inlet Filter Insert" (1 page).

\* cited by examiner

RUN-OFF WATER FILTER FOR STORM DRAINS

REFERENCE TO RELATED APPLICATIONS

This application is a continuation-part of U.S. patent application Ser. No. 10/980,941, filed Nov. 3, 2004 now U.S. Pat. No. 7,208, 082 entitled Drainage Water Filter for Erosion Control, which is incorporated by reference herein in its entirety.

BACKGROUND OF THE INVENTION

1. Field of the Invention

This invention relates to erosion control devices such as those used at a construction site to block dirt and other contaminants from entering the water drainage system.

2. Description of Related Art

At construction sites, dams such as rock bags (semi-porous bags filled with rocks) are typically used to filter the flow of water into storm drains, in order to protect the water quality of the bodies of water into which the storm drain flows, and also to prevent unwanted buildup of these contaminants within the drainage system, which could otherwise clog the drainage system.

For example, a number of rock bags may be positioned around a storm drain in order to filter drainage water from the construction site, and to prevent other construction contaminants from entering the storm drain, thereby reducing water pollution and protecting water quality.

In addition to the rock bags, other portable dams and erosion control systems have been developed. For example, straw waddles include a long tubular-shaped sheath of straw that slows and filters drainage water. Commercial products such as the Gutterbuddy™, available from ACF Environmental of Richmond, Va. (www.acfenvironmental.com) include synthetic fibers bundled in a tube. In addition, inlet protection systems such as the FiltR Fence™, also available from ACF Environmental, include a frame that has a screen-like geotextile sleeve that is attached around the frame's perimeter. In that design, the frame can be assembled by securing the frame members to each other with steel pins. The assembled frame is then placed to protect an inlet. The FiltR Fence™ frame can also be taken apart for ease of transportation.

These erosion control systems all have drawbacks. For example, rock bags are heavy, expensive to implement, and/ or in practice do not function well to prevent pollution. For example, dirt quickly builds up within the rock bags and the other dams, rendering them effectively useless. Dirt and rocks also build up in front of the bags, eventually blocking the flow of water, all of which can create large puddles of backed-up water. While the proper practice would then be to shovel out the dirt and the backed-up water and replace the non-functional bags, in practice construction workers find it easier to just pick up one or two bags and let the water flow through the open space. Furthermore, in a big rainstorm, the flow of water may be so large and forceful as to simply flow right over the bags.

Optimally, the dirt and rocks that build up in front of the bags should be cleaned regularly in order to ensure proper function. However, the rock bags create a difficult obstacle for street sweeping, and rather than moving the heavy bags and re-positioning them, the street sweeper usually just drives around the bags, leaving the dirt and rock buildup in front of the bags.

In addition, the bags are often damaged when they are run over by heavy equipment at a construction site, and even if they are not damaged, eventually they deteriorate due to effects of weather (e.g., sun and water), all of which limits their effectiveness. Severely damaged or deteriorated bags can spill rock, which actually adds to the problem of construction debris rather than reducing it. And at the end of the construction project, removal and disposal of the rocks and rock bags can require considerable time and expense.

Furthermore, the rock bags at best only filter dirt, sand and large objects such as rocks and gravel. Other contaminants such as oil or smaller particles are not filtered by the rock bags, leaving those contaminants to pollute water supplies and clog drainage systems. Specifically, it would be advantageous to provide a filter that effectively filters particulate matter down to 10 microns, a size small enough to include hydrocarbon excess such as may build up on roads from gas and oil spillage, tire wear, and other motor vehicle usage. Such a filter would prevent such particulate waste from getting into the water system.

SUMMARY OF THE INVENTION

A storm drain filter is described herein that includes a filter panel with a frame that holds a bristle filter in a configuration to filter incoming drainage water and thereby protect the storm drain's inlet from contamination and sediment that could otherwise clog the storm drain. The bristle filter includes a plurality of bristles arranged approximately perpendicular to the street surface. The bristles are arranged closely together to filter sediment from drainage water. In one embodiment, the frame can be easily pivoted and/or detached to allow street sweeping and cleaning of the filter. Furthermore, the filter assembly is reusable, and therefore at the end of the construction project, the filter assembly can be simply removed for use at another site. In some embodiments, the filter panel is pivotally attached proximate to a curbside storm drain inlet, thereby allowing the filter panel to be temporarily lifted from its operational position to allow street sweeping. In addition, in some embodiments the filter panel assembly may be detached from the curb to facilitate cleaning.

The frame can be designed to meet a variety of requirements. In one configuration a curbside frame has a configuration that extends along the face of a storm drain inlet. In another configuration a plurality of filter panels are attached to a frame that surrounds a standalone storm drain.

In one embodiment the filter assembly for filtering drainage water flowing along a surface comprises a filter panel including a bristle filter and a frame that holds the bristle filter, the bristle filter including a plurality of bristles attached at their proximate ends in an adjacent configuration along the length of a base, The filter assembly includes at least one seal positioned between the filter panel and the surface, and a pivotable mount for holding the filter panel in an operational position in the path of the flowing drainage water, the pivotable mount allowing the filter panel to rotate between the first, operational position and a second position in which the filter panel is rotated upward and away from the surface.

In one embodiment the plurality of bristles are comprised of polypropylene, and the pivotable mount holds the bristles in a position to form an approximately 90° angle with respect to the flow direction of the drainage water. One embodiment may comprise a lower flexible seal (the seal may comprise rubber) affixed to the filter panel, the flexible seal arranged to cover a gap between the filter panel and the surface, and thereby directing water to the plurality of bristles. This embodiment may includes pair of flexible side seals, each seal connected respectively to one of the mounting beams. The pivotal mount may have a system for detaching the filter assembly from the curb, which may include a removable pin.

In one embodiment the pivotable mount comprises a mounting bracket affixed proximate to a storm drain inlet, and a pair of mounting beams affixed on opposite sides of the filter panel, the mounting beams comprising means for pivotal connection to the mounting brackets.

One embodiment, designed for a standalone strorm drain, comprises a plurality of filter panels, and a frame having a configuration that surrounds the standalone storm drain, the frame holding each of the plurality of filter panels in the path of the flowing drainage water. A flexible seal may be affixed to the lower beam of each of the filter panels, the flexible seals arranged to cover a gap between the filter panel and the surface, and thereby directing water to the plurality of bristles.

A method of filtering sediment-laden drainage water and removing deposited sediment from at a storm drain inlet is described, comprising situating a filter panel in a first operational position proximate to the storm drain inlet, allowing drainage water to flow through the filter panel thereby depositing sediment in front of the filter panel, rotating the filter panel upwardly and away from the storm drain inlet, to a second position in which the storm drain inlet is uncovered, removing the deposited sediment, and rotating the filter panel downwardly after removing the sediment. The method may further comprise detaching the filter panel, cleaning the filter panel at a remote location, and returning the filter panel to its first position proximate to the storm drain inlet.

In embodiments where the bristles comprise a material that adheres to oil-based compounds (such as polypropylene), oil-based compounds in the water adhere to the polypropylene during the step of flowing drainage water through the filter panel.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described herein with reference to the figures, in which like numbers represent the same or similar elements.

Overview

A filtering system is disclosed herein that utilizes a filter assembly that includes a bristle filter for filtering out dirt, sand, rock, debris, and possibly other contaminants (such as oil) in drainage water run-off, and preventing it from entering into a water drainage system.

The filtering system is described herein in the context of construction sites that have a large amount of broken ground and a correspondingly large amount of dirt- and rock-laden run-off; however, it could also be used in other locations, for other drainage systems, and in a variety of implementations such as municipalities or other governing bodies that may be required to filter drainage water. In one implementation described herein, a bristle filter is affixed to a frame that is designed to pivotally hold the filter assembly against a curbside storm drain. The frame has a configuration to surround the storm drain and situate the bristle filter in a position to filter drainage water and protect the storm drain against contamination. In one embodiment, the bristle filter panel is rotatable, which advantageously allows it to easily conform its shape to different road surface elevations and irregularities.

Storm Drain Background Information

A storm drain includes an inlet positioned to receive drainage water, which is then directed using a drainage system that typically includes a network of pipes and conduits to a disposal area. Via this drainage system, typically the run-off water eventually flows into another body of water, such as a river, lake, or ocean. In land-locked locations, the run-off water may be directed to a low-lying area from which it can drain into the ground water, or evaporate.

Storm drains may have a number of forms; such as a curbside storm drain that has an inlet positioned to receive water as it flows along a curb, or a "stand-alone" storm drain (wash-out) that has an inlet anywhere on a surface where water would normally collect, such as a low point in a road or intersection. Usually storm drains are discussed in the context of a paved surface; however, storm drains may also be implemented on non-paved surfaces, such as rock, gravel, or dirt.

Description of Filter Assembly and Pivotable Mount

Figure 1:
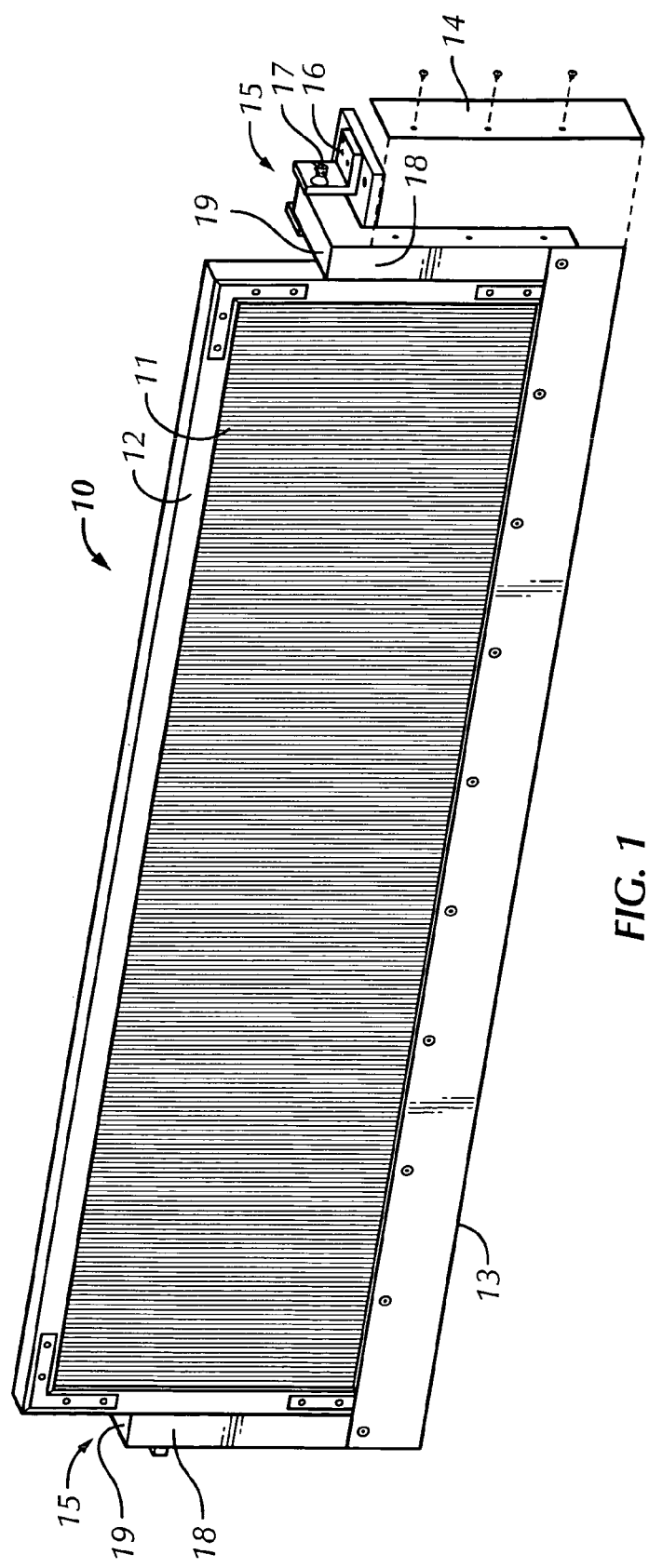
FIG. 1 is a perspective view of a rotatable filter assembly including a panel filter and pivotable mounts on each end that allow rotation between a downward (operational) position and an upward (cleaning) position.
Figure 2:
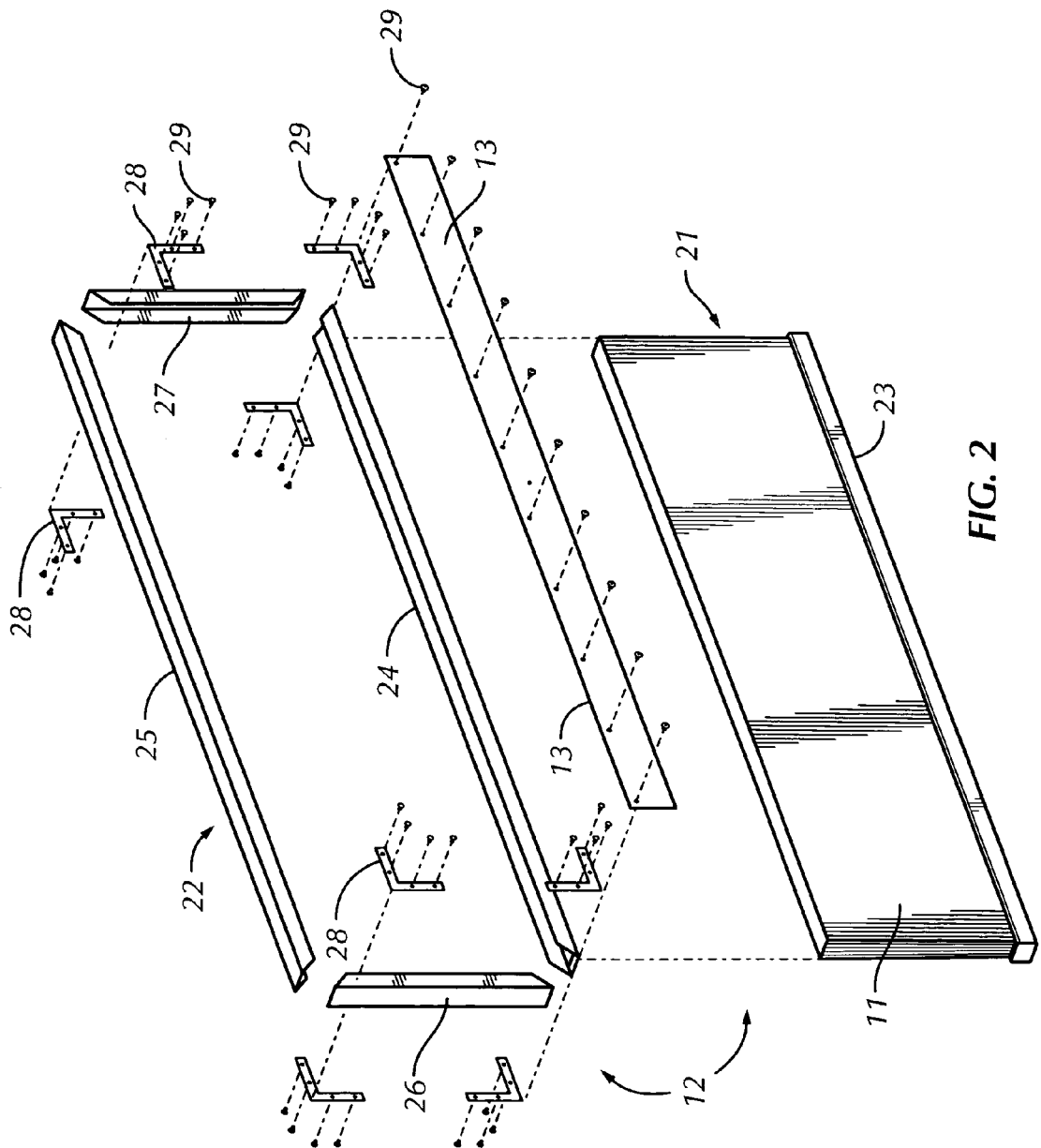
FIG. 2 is an exploded, perspective view of the filter panel including the bristle filter.

Reference is made to FIGS. 1 and 2 to disclose one embodiment of a filter panel and a pivotable mount. It should be apparent that other embodiments with different constructions can provide a suitable filter panel and a pivotable mount.

Any suitable structural components may be utilized to implement the panel and the pivotable mount. For example, the panel may be constructed of readily available metal struts and connectors to fit the size requirements of the storm drain, and/or it may be constructed of non-metallic struts and connectors such as those manufactured by Seasafe, Inc. of Lafayette, La. (www.seasafe.com).

FIG. 1 is a perspective view of one filter assembly 10 that includes a bristle filter panel 12 and a pivotable mount 15. FIG. 2 is an exploded view of one embodiment of a filter panel 12. Generally, the filter panel has a construction including a bristle filter that has a plurality of bristles 11 arranged vertically against the flow of drainage water.

In addition to the filter panel and the pivotable mount, the filter assembly 10 includes a lower seal 13 affixed to the lower end of the filter panel, and a pair of side seals 14 affixed to the mount. In FIG. 1, for illustration purposes one of the side seals 14 is shown exploded from the leg 18 to which it is attached; it should be clear that the side seals are affixed in the front by a group of fasteners, in a configuration that allows the back (the part facing the curb) to extend beyond the beam in a backward direction to engage with the curb. The seal comprises a flexible material such as thick rubber having a configuration to cover the gap between the adjacent surface, such as the road or curb surface (as discussed with reference to FIGS. 3 and 4). Particularly, the lower flexible seal 13 is affixed to the filter panel, and is arranged to cover the gap between the filter panel and the surface, thereby directing water to the plurality of bristles. The side seals 14 are connected respectively to each of the L-shaped beams, and the seals are arranged to cover the gap between the filter panel and the curb. The flexibility of the lower seal and the side seals allows it to conform (i.e., bend) to variations in the road, while still maintaining a substantially watertight seal.

Figure 3:
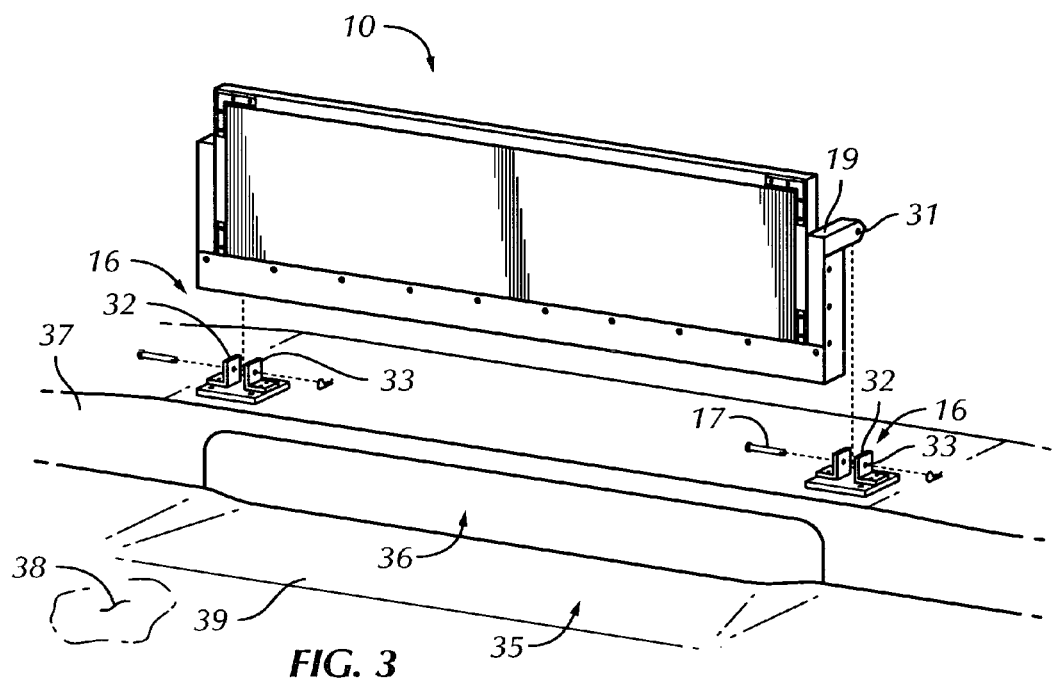
FIG. 3 is a perspective view of a curbside storm drain and a rotatable filter assembly, illustrating one of the ways in which the assembly can be attached to the storm drain.

As shown in FIG. 1, the pivotable mount includes a mounting bracket 16 and an L-shaped beam that has a first leg 18 and a second leg 19. The L-shaped beam has its first leg 18 connected to the side of the filter panel 12. The second leg 19 extends backwards to pivotally connect with the bracket 16. Referring briefly to FIG. 3, in this embodiment, the second leg 19 includes a hole 31 formed proximate to the mounting bracket 16. The mounting bracket 16 includes a corresponding receiving section that has two extended flanges 32, and the second leg 19 fits between the two flanges. A locking pin 17 is used to pivotably secure the second pin between the two flanges: particularly the locking pin 17 extends through holes 33 in each of the flanges, and the hole 31 in the second leg, in order to allow pivotal motion about the locking pin 17.

FIG. 2 is an exploded view of one filter assembly 29 that comprises filter components including a bristle filter panel 12. The filter panel includes a bristle filter and a plurality of structural components interconnected by suitable connectors. Advantageously, the rail and the bristle can be designed and implemented to save cost, and even to use off-the-shelf components.

The bristle filter panel 12 includes bristle filter 21 and structural panel components shown generally at 22. Generally, the bristle filter 21 includes the plurality of bristles 11 and a beam 23 to which the bristles are affixed at their lower ends in this embodiment. Specifically, the bristle filter panel includes a plurality of stiff but flexible bristles 11 bundled together at their lower ends, and held by the beam 23. The lower beam 23 holds the upper ends of the bristles together, and it may be rigid, or it may have some flexibility as appropriate for the desired use.

The bristles 11, held in place at their ends by the beam 23, are arranged in a configuration as appropriate for the intended use; typically, the ends of the bristles are affixed closely adjacent to each other. The affixed ends of the bristles are connected to the beam by any suitable means, such as glue and/or pressure provided by the beam (e.g., crimping by the beam), or molding. If the affixed ends of the bristles are positioned adjacent to each other, then the bristle density is determined by how closely the bristles can be practically positioned together. The bristles are oriented approximately perpendicular to the beam; however, in alternative embodiments the bristles may have a non-perpendicular orientation in any direction. The bristles 11 have a length, diameter, stiffness, and material chosen to provide the desired filtering action and a sufficient structural strength to withstand the force of flowing drainage water. For example, in one embodiment the bristles have a length of about 12.0 inches, a diameter of about 0.1 inch, and are comprised of polypropylene.

Generally, the bristles have a particular length, diameter, and arrangement as determined by the particular design and intended application. For example, the bristle's length and diameter are determined by design considerations such as the flexibility and strength of the bristles, and the particular material used. The arrangement of the bristles (e.g., the density and number of bristles) presented to the flowing water is also determined by design considerations; particularly the bristles are arranged with an appropriate depth from the front edge sufficient to withstand the force of flowing water; for example, if the bristles are formed of a relatively stiff material (e.g., polypropylene), and have a diameter of about 0.1", a depth of four or five bristles from the front edge to the back edge may be sufficient.

One particularly advantageous material for the bristles 11 is polypropylene, which has been observed to "collect" oils, hydrocarbons, and organic compounds from the surface of water, and to adhere to the surface of the polypropylene bristles, which is very useful. Since the bristles "collect" such compounds by adherence, and the filter can be removed and cleaned to remove the collected compounds that adhere to the bristles, such a function can be particularly useful to reduce the amount of hydrocarbons and other organic compounds in drainage water run-off, as will be described in more detail.

The panel components shown generally at 22 include a plurality of rails 24, 25, 26, and 27, a plurality of L-brackets 28 that connect the rails at the corners, and a plurality of connectors 29, such as screws or rivets that connect the L-brackets to the rails. The rails have a configuration to accept and receive the bristle filter 21; particularly a lower rail 24 has an interior section to engage the connecting beam 23, an upper rail 25 has an interior section to engage the loose ends of the bristles 11, and two side rails 26 and 27 have interior sections to engage the side bristles of the bristle filter 21.

Description of Curbside Storm Drain Filter Assembly

Figure 4:
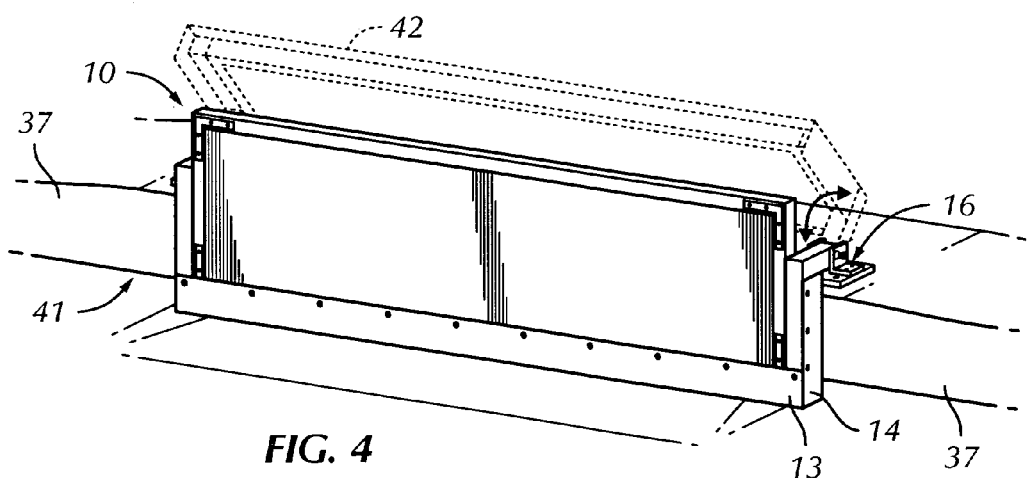
FIG. 4 is a perspective view of a curbside storm drain and the filter assembly positioned on the storm drain, illustrating a downward position in solid lines and an upwardly rotated position in dashed lines.

Reference is now made to FIGS. 3 and 4. FIG. 3 shows a curbside storm drain 35 that includes an inlet 36, formed as an opening in a curb 37, and a road 38 that has a downward sloping section 39 that leads water to the inlet 36. The inlet 36 then directs drainage water, via a system of pipes and conduits (not shown), to a drainage water disposal area.

FIGS. 1 and 2 (discussed above) show views of a curbside filter assembly 10. In FIG. 3, the filter assembly 10 is illustrated in perspective view, "floating" above the storm drain 35. Dashed lines drawn from the filter assembly show how the pair of second arms 19 is positioned respectively within the pair of mounting brackets 16.

Each mounting bracket 16 is affixed to the sidewalk proximate to the storm drain by any suitable attachment system, such as by screws in concrete, or by an adhesive. In this embodiment, the two brackets 16 are positioned proximate to the opposite ends of the inlet, with a separation that matches the distance between the pair of second arms.

The filter assembly 10 has a length sufficient to cover the inlet opening in the storm drain. Because the length of the inlet opening varies from storm drain to storm drain (generally determined by engineers to meet water flow requirements), the filter assembly 10 cannot have a single standard size, but instead may be provided in a variety of lengths in order to accommodate the various storm drains. In other words, since storm drain inlets have varying lengths, the filter panels may be provided in a number of different lengths, and during installation, the appropriate length of the filter panel can be selected to accommodate the length of the particular inlets. Thus, the filter assembly can be assembled easily, transported efficiently, and stored in a small area, all of which can be advantageous.

In FIG. 4 the filter assembly 10 has been affixed into the brackets 16. The filter assembly shown in solid lines is in operational position 41 on the storm drain. In this first (operational) position 41, the side seals 14 cover the gap between the L-shaped mounting bracket and the adjacent portion of the curb, and the lower seal covers the gap between the filter panel and the road.

In a second (upwardly-rotated) position, as shown in dashed lines at 42, the filter assembly 10 has been removed from the inlet of the storm drain, and rests in a position above the storm drain. In this second position, the sediment in front of the inlet can be cleaned away, and the inlet can be accessed easily. Furthermore, the filter assembly 10 can be detached from the curb (as shown in FIG. 3), and then transported to a remote location for cleaning, such as by power washing. After cleaning, it can then be re-installed.

Method of Operation

Reference is now made to FIGS. 5A, 5B, 5C, 5D, and 6 to describe a method of operation in which drainage water is filtered by a filter assembly 10, and then sediment is removed (and optionally the filter assembly itself is cleaned).

Figure 5A:
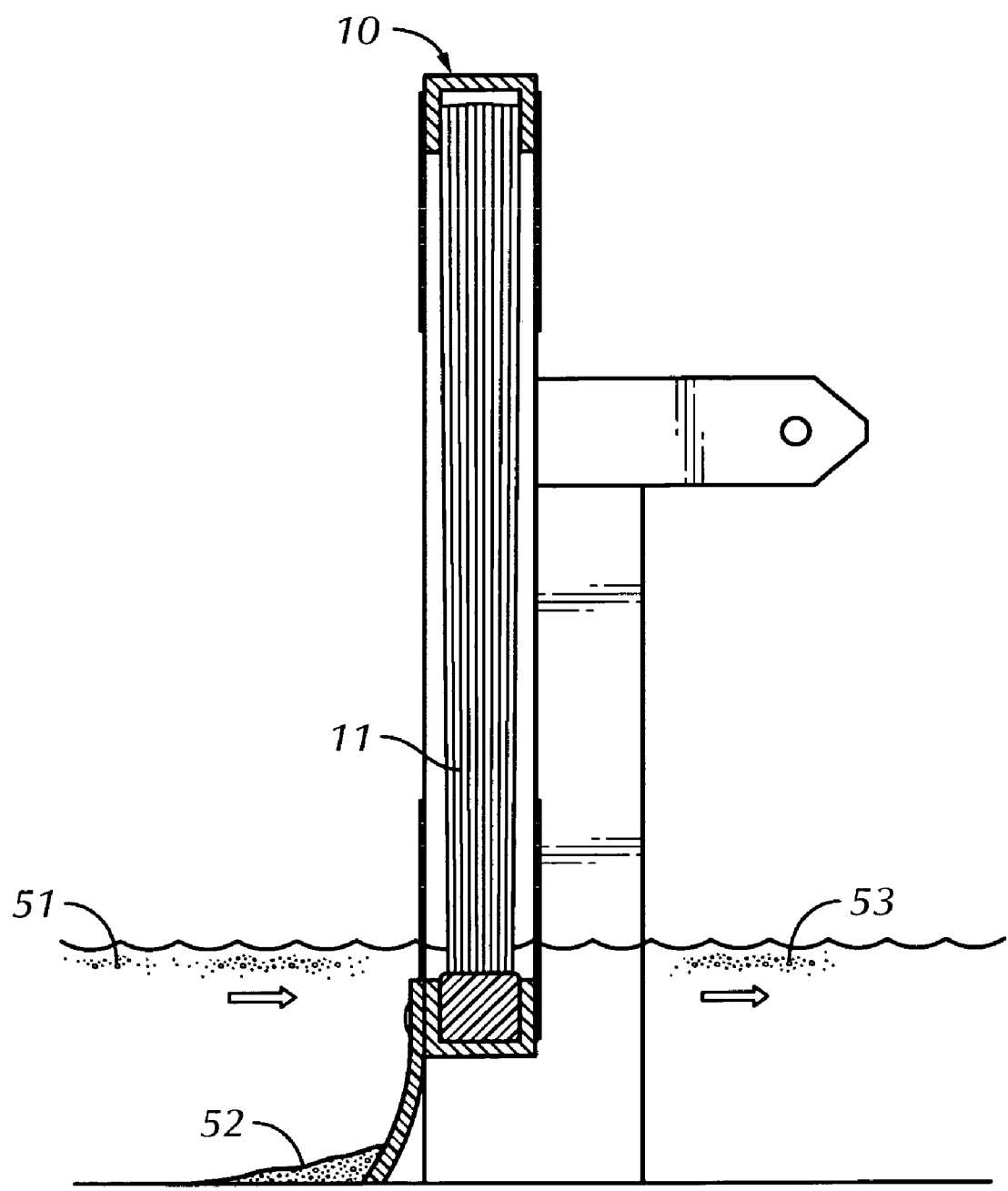
FIG. 5A is a cross-sectional view of a bristle filter panel in flowing drainage water, illustrating sediment (and/or other debris and contaminants) collecting in front of the panel.
Figure 5B:
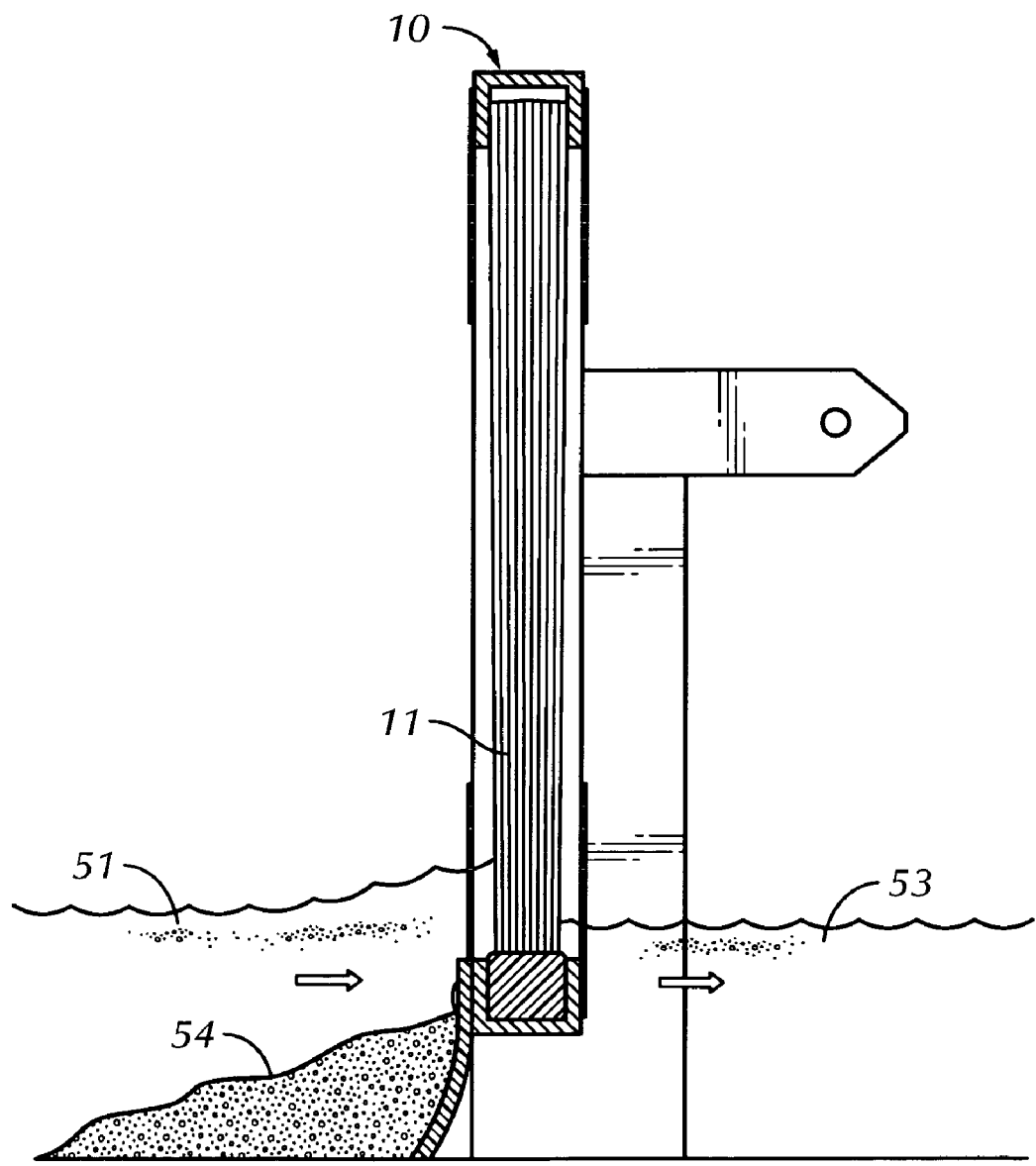
FIG. 5B is a cross-sectional view of the filter assembly as in FIG. 5A, illustrating flowing drainage water at a later point in time after which a significant amount of sediment (and/or other debris and contaminants) has built up in front of the bristle filter panel.
Figure 5C:
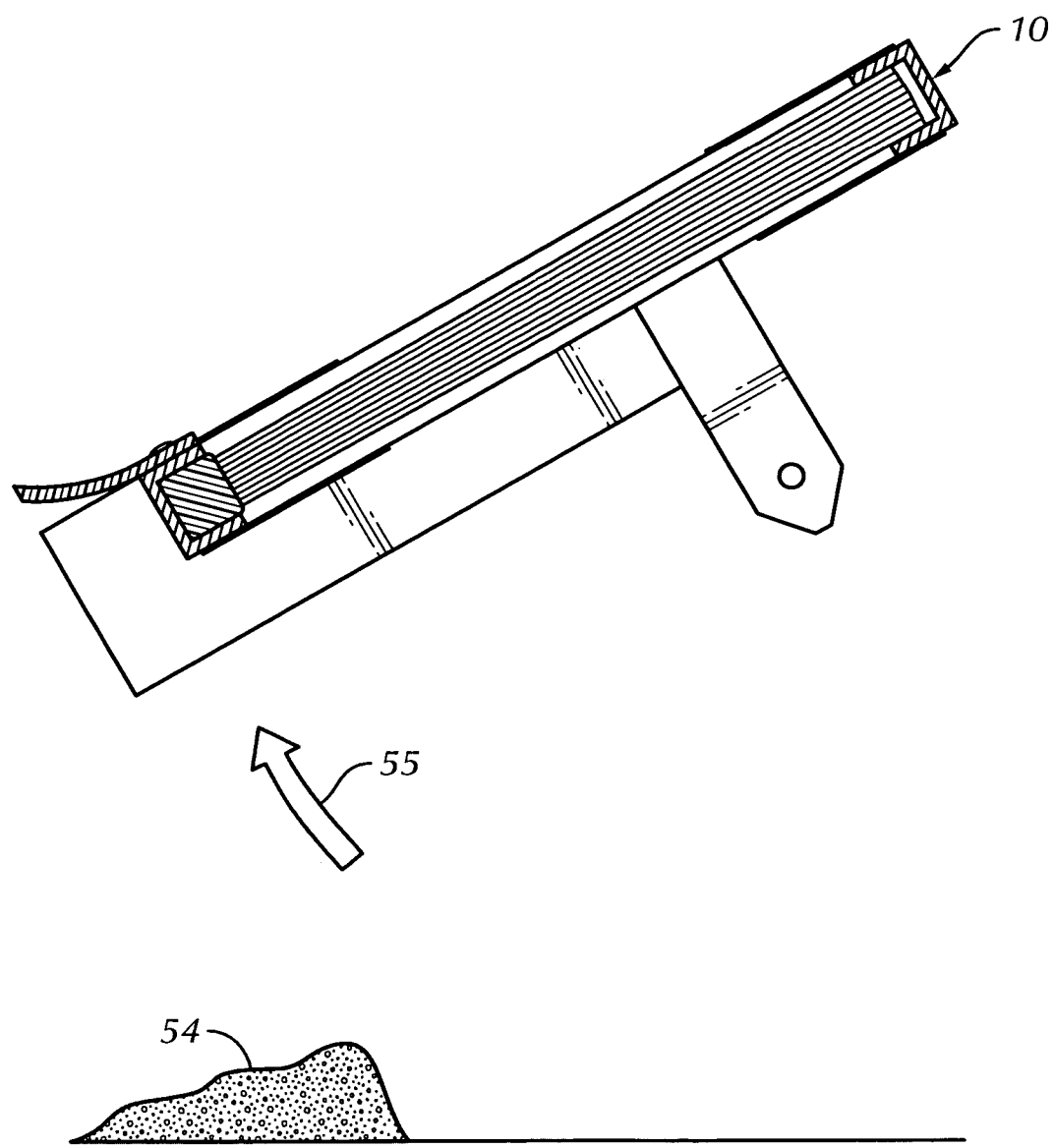
FIG. 5C is a cross-sectional view of the filter assembly as in FIG. 5B, after the water has stopped flowing, illustrating the panel rotated upward.
Figure 5D:
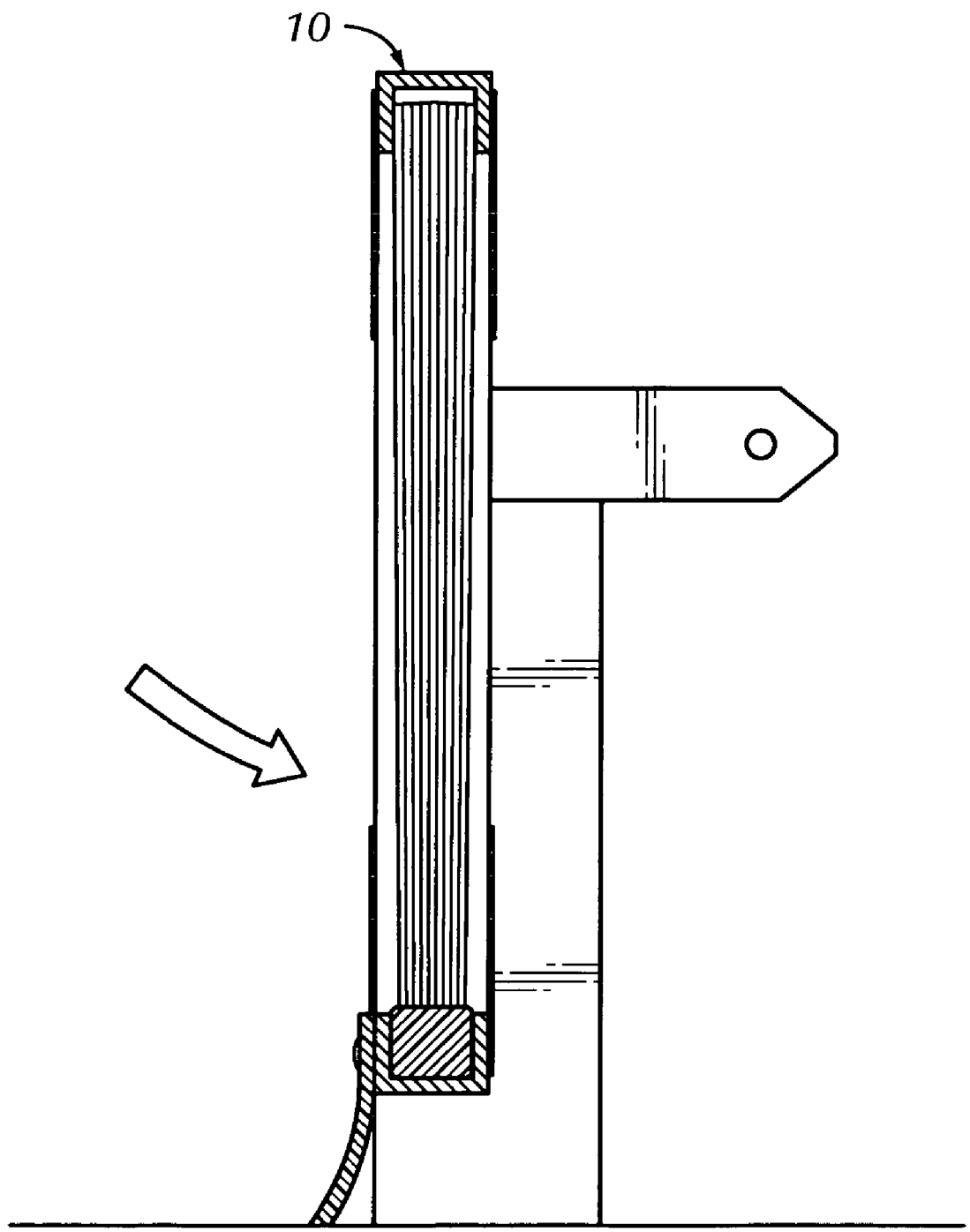
FIG. 5D is a cross-sectional view of the filter assembly as in FIG. 5C, after the sediment (and/or other debris and contaminants) has been removed (such as by street sweeping), illustrating the panel rotated back into position in front of the storm drain.

FIG. 5A is a cross-sectional view of the filter assembly with drainage water beginning to flow therethrough, and FIG. 5B is a cross-sectional view of the filter assembly with flowing drainage water, after significant sediment has built up in front of the filter panel. FIG. 5C a cross-sectional view of the filter assembly rotated upwardly, and FIG. 5D is a cross-sectional view of the filter assembly returned to operational position after the sediment has been cleaned away. In the sectional views of FIGS. 5A, 5B, 5C, and 5D, the side seal is shown partially cut away to reveal the filter panel in cross-sectional view. For illustrative purposes in FIGS. 5A and 5B, the water flow is shown viewed through the side seal, as if it were transparent.

Figure 6:
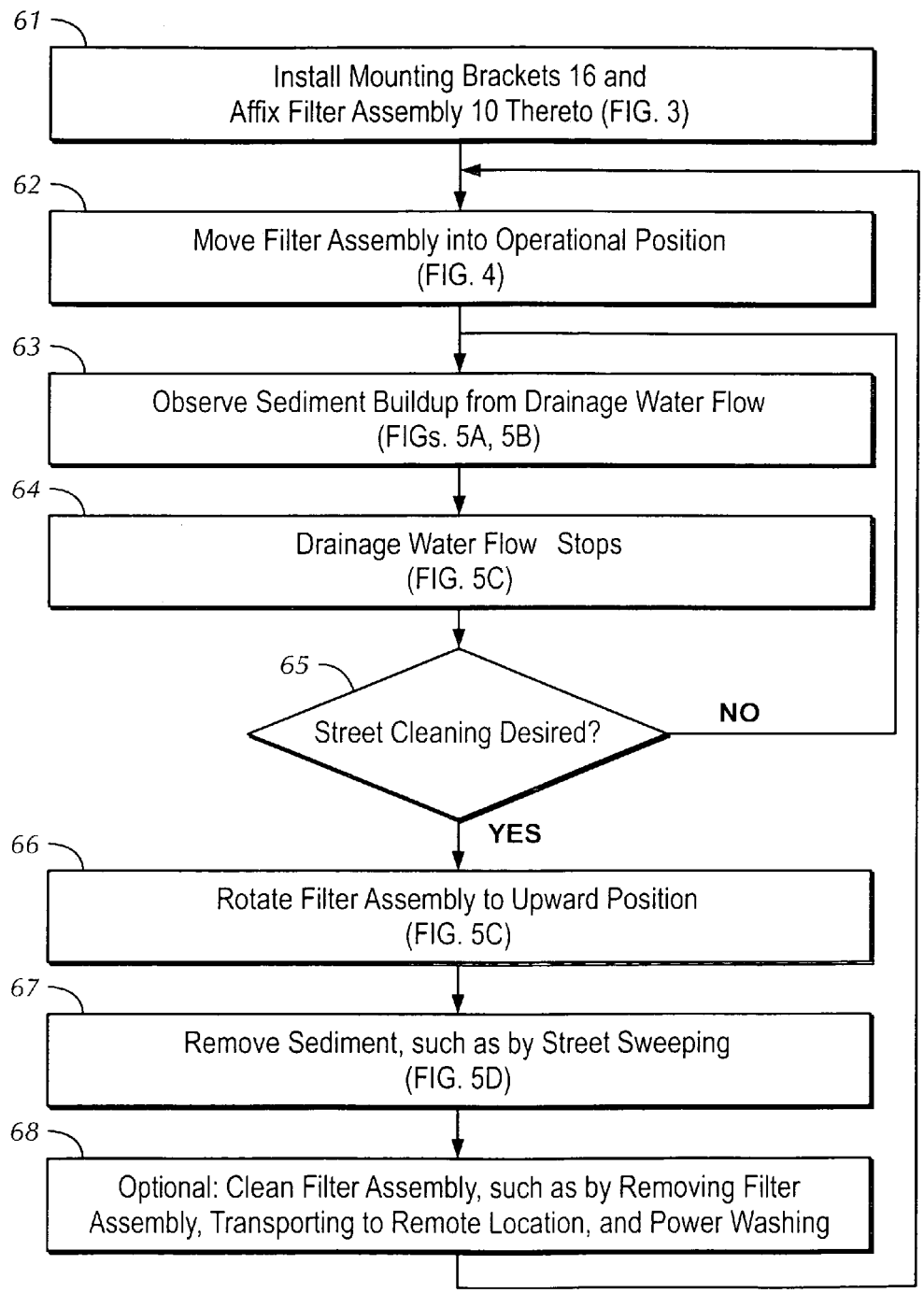
FIG. 6 is a flowchart of operations illustrating the sequence of positioning the filter and then cleaning after sediment has built up, with reference figures listed in the box as appropriate.

FIG. 6 is a flowchart of operations illustrating the sequence of positioning the filter and then cleaning after sediment has built up, with reference figures listed in the box as appropriate. At 61, the mounting brackets 16 are installed and the filter assembly 10 is affixed thereto, such as shown in FIG. 3.

At 62, the filter assembly is moved into operational position 41, such as shown in FIG. 4.

At 63, sediment buildup is observed from drainage water flowing therethrough, as shown in FIGS. 5A and 5B, when sediment-laden flowing drainage water 51 encounters the filter assembly 10, all the water is forced through the bristles 11, and sediment (e.g., dirt, silt, rocks, and debris) is stopped in front of the filter and the sediment is deposited in a small sediment deposit 51 at the leading edge of the filter assembly 10. (Water flows from left to right, as indicated by the arrows.) In addition the drainage water 51 may contain other contaminants (such as oil), which may adhere to the surface of the bristles and/or build up in front of filter. Cleaned water 53 exits from the filter assembly, and flows into the storm drain inlet, for example.

It may be noted that over time, as the sediment deposit builds up, the water level through the bristle filter panel rises, and therefore the water flow would not be significantly constricted as the sediment builds up (at least until the water level reaches the top of the filter panel). FIG. 5B is a side view as in FIG. 5A, except that FIG. 5B shows a large sediment deposit 54 that is much deeper than the first sediment deposit 52 shown in FIG. 5A. Still, the water flow is substantially unconstricted as shown in FIG. 5B. Thus, the bristle filter panel advantageously allows water to flow through substantially unrestricted even if a significant amount of sediment has been deposited in front.

At 64, at some point in time, the flow of drainage water eventually stops. At this point, it may become desirable to perform street cleaning operations, as illustrated at 65.

At 65, if street cleaning is not desired yet, operation simply returns to a previous step, such as observing additional sediment buildup at 63. However, still at 65, if street cleaning is desired, the operation moves to 66.

At 66, the filter assembly is rotated to an upward position 42, such as shown in FIG. 4 in dashed lines, and by arrow 55 in FIG. 5C. In order to move the filter assembly for cleaning or for any other purpose, the filter assembly may be lifted by hand, or if it is too long or heavy to be practically operated by hand, machinery may be utilized, or a rope and pulley assembly (not shown) may be included.

At 67, the sediment deposit 54 is cleaned from the road surface, such as by conventional street sweeping.

At 68, optionally, the filter assembly itself may be cleaned, for purposes such as removing oil and other contaminants from the bristles. In this optional step, the filter assembly 10 may be removed (see FIG. 3), and transported to a remote location for cleaning, such as by power washing. Alternatively, a system may be provided for cleaning the filter assembly without removing it to a remote location.

When street cleaning is complete (and the optional step 68 completed if desired), the filter assembly is then placed back into operational position, as shown at 62, and operation repeats.

Thus, the filter assembly 10 may be moved to allow street sweeping, and when street cleaning is complete, the filter assembly can be rotated back to easily re-position the bristle filter panel in its operational position by the curb. Additionally, the filter assembly may be detached from the curb and cleaned in a remote location. The clean filter assembly can then be re-installed, or a new filter assembly can be installed in its place.

Standalone Storm Drain

Figure 7:
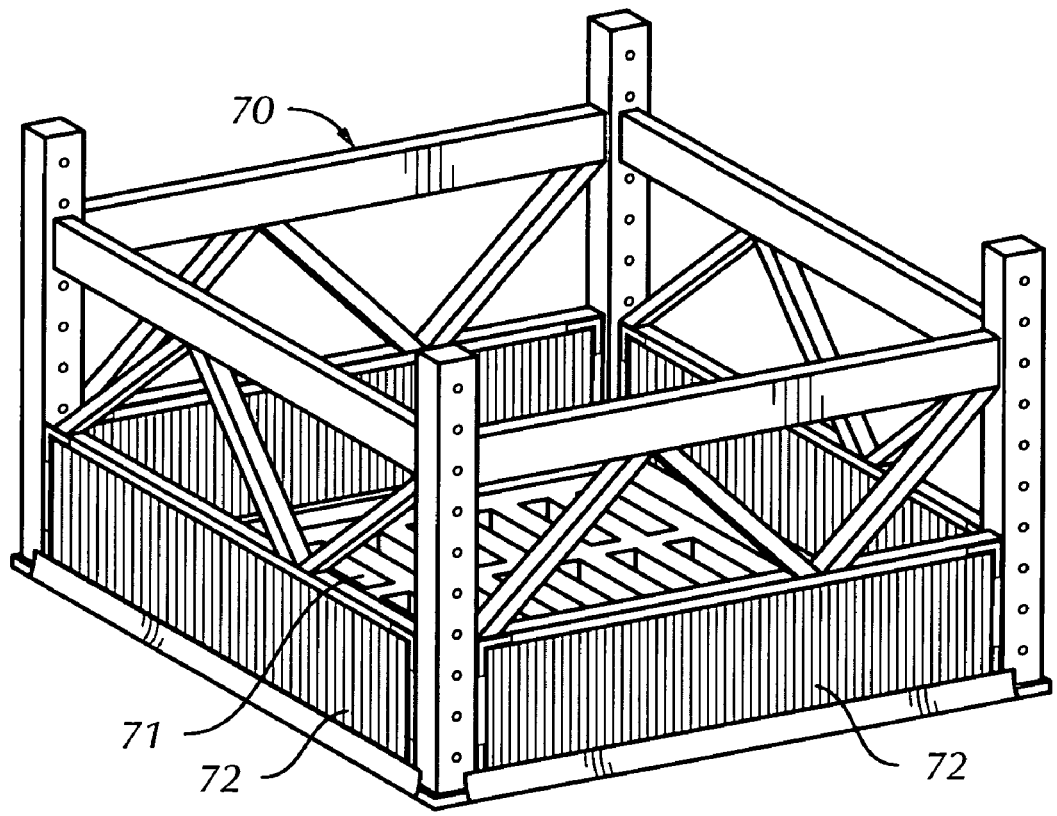
FIG. 7 is a perspective view of a stand-alone (washout) storm drain and plurality of filter assemblies positioned in a frame surrounding the storm drain.

FIG. 7 is an example of an embodiment of a frame structure 70 that is designed to surround a standalone storm drain 71. Particularly, the frame structure 70 forms a closed structure that completely surrounds the sides of the standalone storm drain. At its lower end the frame structure 70 attaches to a plurality of filter panels 72, each of which includes a bristle filter panel. For example, some or all of the filter assemblies 72 may be similar or identical to the filter assembly shown in FIGS. 1 and 2.

ALTERNATIVE EMBODIMENTS

It will be appreciated by those skilled in the art, in view of these teachings, that alternative embodiments may be implemented without deviating from the spirit or scope of the invention.

The filter assemblies may be provided in any of a number of different embodiments, some of which are discussed with reference to FIGS. 3, 4, and 7, although other embodiments are possible. Typically, the filter assembly includes at least a filter component including a bristle filter panel that has bristles positioned for filtering of large particles in water run-off, such as dirt, sand and rocks, in order to separate them from the drainage water and prevent them from flowing into the storm drain inlet.

In alternative embodiments, the filtering system may also include one or more secondary filters in addition to the primary bristle filter panel. The secondary filter can further filter the water after it passes through the bristle filter panel(s) as appropriate for a particular use. For example a screen or other filter may be situated on an additional beam within the frame to filter out smaller contaminants such as silt that goes through the primary filter(s), and/or an oil filtration bag as discussed in more detail herein, which can remove oil and/or other hydrocarbon compounds from the water as it flows by. In other words, one or more additional filters can be attached to the inside of the frame, downstream from the filter assemblies to provide further filtering. There are many types of filters available, and the frame can provide opportunities to attach these filters in a way to re-filter the water that has already been initially filtered by the primary filter.

The embodiment discussed with reference to FIGS. 3 and 4 has a configuration for holding the filter assembly including a frame designed to protect a curbside storm drain, and the embodiment discussed with reference to FIG. 7 includes a frame designed to protect a standalone storm drain; it should be apparent other suitable frame constructions and configurations may be utilized.

This invention is to be limited only by the following claims, which include all such embodiments and modifications when viewed in conjunction with the above specification and accompanying drawings.

What is claimed is:

1. A filter assembly for filtering drainage water flowing along a surface comprising: a filter panel including a bristle filter and a frame that holds the bristle filter, said bristle filter including a plurality of bristles attached at their proximate ends in an adjacent configuration along the length of a base; at least one seal positioned between said filter panel and said surface; and a pivotable mount for holding said filter panel in an operational position in the path of said flowing drainage water, said pivotable mount allowing said filter panel to rotate between said first, operational position and a second position in which said filter panel is rotated upward and away from said surface.

2. The apparatus of claim 1 wherein said plurality of bristles are comprised of polypropylene.

3. The apparatus of claim 1 wherein said pivotable mount holds said bristles in a position to form an approximately 90.degree. angle with respect to the flow direction of said drainage water.

4. The apparatus of claim 1, wherein said at least one seal comprises a lower flexible rubber seal affixed to the filter panel, said flexible rubber seal arranged to cover a gap between the filter panel and the surface, and thereby directing water to said plurality of bristles.

5. The apparatus of claim 1 wherein said pivotal mount comprises means for detaching said filter assembly from said curb.

6. The apparatus of claim 1 for pivotal mounting proximate to a curbside storm drain, wherein said pivotable mount comprises a mounting bracket affixed proximate to a storm drain inlet, and a pair of mounting beams affixed on opposite sides of said filter panel, said mounting beams comprising means for pivotal connection to said mounting brackets.

7. The apparatus of claim 6 wherein said filter assembly further comprises a pair of side seals, each seal connected respectively to one of said mounting beams.

8. The apparatus of claim 1 wherein said frame has a configuration that surrounds a standalone storm drain inlet, and further comprising a plurality of bristle filter panels positioned around the periphery of said frame.

9. The apparatus of claim 8 for filtering drainage water flowing to a standalone storm drain inlet situated on an approximately flat, horizontal surface, and further comprising: a frame having a configuration to surround an area around a storm drain inlet situated on an approximately flat, horizontal surface, said frame including at least a first side section and a second side section attached at their proximate ends along the length of a substantially rigid beam; and wherein said frame holds a first of said plurality of bristle filter panels on the first side section, and a second bristle filter panel on the second side section, each of said bristle filter panels situated so that the bristles are situated in the path of drainage water flowing to said standalone storm drain inlet.

10. A filter assembly for filtering drainage water flowing along a road surface into a curbside storm drain including an inlet formed in a curb, comprising: a filter panel including a bristle filter and a frame that holds the bristle filter, said bristle filter including a plurality of bristles attached at their proximate ends in an adjacent configuration along the length of a base; at least one seal positioned between said filter panel and said surface; and a pivotable mount for holding said filter panel in an operational position proximate to said curbside storm drain and in the path of said flowing drainage water, said pivotable mount allowing said filter panel to rotate between said first, operational position and a second position in which said filter panel is rotated upward and away from said surface.

11. The apparatus of claim 10 wherein said plurality of bristles are comprised of polypropylene.

12. The apparatus of claim 10 wherein said pivotable mount holds said bristles in a position to form an approximately 90.degree. angle with respect to the flow direction of said drainage water.

13. The apparatus of claim 10, wherein said at least one seal comprises: a lower flexible seal affixed to the filter panel, said flexible seal arranged to cover a gap between the filter panel and the surface, and thereby directing water to said plurality of bristles; and a pair of side seals, each seal connected respectively to one of said mounting beams and arranged to cover a gap between the filter panel and said curb.

14. The apparatus of claim 10, wherein said pivotable mount comprises a mounting bracket affixed proximate to the storm drain, and a pair of mounting beams affixed on opposite sides of said filter panel, said mounting beams comprising means for pivotal connection to said mounting brackets.

15. The apparatus of claim 10 wherein said pivotal mount includes means for detaching said filter assembly from said curb.

16. A filter assembly for filtering drainage water flowing along a surface to a standalone storm drain comprising: a plurality of filter panels each including a bristle filter and a frame that holds the bristle filter, each bristle filter including a plurality of bristles attached at their proximate ends in an adjacent configuration along the length of a base; and a frame having a configuration that surrounds said standalone storm drain, said frame holding each of said plurality of filter panels in the path of said flowing drainage water, wherein said bristles are comprised of polypropylene, and said filter assembly further comprising a flexible seal affixed to the lower beam of each of the filter panels, said flexible seals arranged to cover a gap between the filter panel and the surface, and thereby directing water to said plurality of bristles.

* * * * *